(12) United States Patent
Mani

(10) Patent No.: US 10,282,469 B2
(45) Date of Patent: May 7, 2019

(54) SYSTEM AND METHOD FOR SUMMARIZING A MULTIMEDIA CONTENT ITEM

(71) Applicant: OATH INC., New York, NY (US)

(72) Inventor: Inderjeet Mani, Sunnyvale, CA (US)

(73) Assignee: OATH INC., New York, NY (US)

( * ) Notice: Subject to any disclaimer, the term of this patent is extended or adjusted under 35 U.S.C. 154(b) by 956 days.

(21) Appl. No.: 14/224,511

(22) Filed: Mar. 25, 2014

(65) Prior Publication Data

US 2015/0279390 A1  Oct. 1, 2015

(51) Int. Cl.
| | |
|---|---|
| *G10L 25/48* | (2013.01) |
| *G06F 17/30* | (2006.01) |
| *G10L 15/18* | (2013.01) |
| *G10L 15/26* | (2006.01) |

(52) U.S. Cl.
CPC ........ *G06F 17/30719* (2013.01); *G10L 25/48* (2013.01); *G10L 15/18* (2013.01); *G10L 15/26* (2013.01)

(58) Field of Classification Search
CPC .......................... G06F 17/241; G06F 17/2755
USPC ......................................................... 715/204
See application file for complete search history.

(56) References Cited

U.S. PATENT DOCUMENTS

2005/0276570 A1* 12/2005 Reed, Jr. ........... G06F 17/30038
386/231

FOREIGN PATENT DOCUMENTS

| WO | WO 2009042340 | 4/2009 |
| WO | WO 2013006497 | 1/2013 |
| WO | WO 2013066497 | 1/2013 |

OTHER PUBLICATIONS

Dubey et al., "Diversity in Ranking via Resistive Graph Centers," 2011.*

(Continued)

*Primary Examiner* — Shawn S Joseph
(74) *Attorney, Agent, or Firm* — James J. DeCarlo; Greenberg Traurig, LLP

(57) ABSTRACT

A multimedia content item is summarized based on its audio track and a desired compression budget. The audio track is extracted and processed by an automatic speech recognizer to obtain a time-aligned text transcript. The text-transcript is partitioned into a plurality of segment sequences. An informativeness score based on a salience score and a diversity score is computed for each of the segments. A coherence score is also computed for the segments in the plurality of sequences. A subsequence of one of the segment sequences that optimizes for informativeness and coherence is selected for generating a new content item summarizing the multimedia content item.

21 Claims, 11 Drawing Sheets

(56) References Cited

OTHER PUBLICATIONS

Zweig et al., "Continuous Speech Recognition with a TF-IDF Acoustic Model," 2010.*
Mani et al., "Using Cohesion and Coherence Models for Text Summarization," 1998 (Year: 1998).*
Alemany, "Representing discourse for automatic text summarization via shallow NLP techniques," 2005 (Year: 2005).*
Brin, et al. "The Anatomy of a Large-Scale Hypertextual Web Search Engine"; Stanford, CA; 20 pages.
Mihalcea, Rad; "Language Independent Extractive Summarization"; University of North Texas; 4 pages.
Mei, Q., et al. "DivRank: the Interplay of Prestige and Diversity in Information Networks"; University of Michigan; Jul. 25-28, 2010; 10 pages.
Lin, Chin-Yew; "Rouge: A Package for Automatic Evaluation of Summaries"; University of Southern California; ACL 2004; 10 pages.

* cited by examiner

|  | ROUGE-1 | | | ROUGE-SU4 | | |
|---|---|---|---|---|---|---|
|  | P | R | F | P | R | F |
| ASR | 0.7374 | 0.4178 | 0.4449 | 0.5978 | 0.3127 | 0.3305 |
| MANUAL | 0.7372 | 0.4671 | 0.5154 | 0.5952 | 0.3567 | 0.3960 |

FIG. 9

SYSTEM AND METHOD FOR SUMMARIZING A MULTIMEDIA CONTENT ITEM

BACKGROUND

The proliferation of data networks and mobile devices provides users with instantaneous access to text, audio or video content via various electronic devices such as laptops, tablet computers, smartphones or wearable computers. As a result, users now suffer from content overload so that they do not have time to review all the content provided to them. Various solutions have been explored in order to address users' content fatigue. Content personalization is one example where only content tailored to a user's preferences is provided to the user. Another solution is content summarization wherein a longer content item can be condensed such that the users are able to consume such content within the limited time they have at their disposal.

SUMMARY

This disclosure relates to systems and methods for summarizing multimedia content items. A method executed by a processor for summarizing a multimedia content item is disclosed in an embodiment. The method comprises, receiving, by a processor, a content item comprising an audio track as input along with a desired compression budget. A time-aligned text transcript of the audio track is obtained by the processor. The processor partitions the text transcript into a plurality of sequences of segments, wherein each sequence of segments corresponds to a respective series of non-overlapping time intervals different from non-overlapping time interval series of other sequences. An informativeness score is determined for each segment in a sequence of the plurality of sets of segment sequences, where the informativeness score reflects the segment's coverage of key non-redundant information in the source content item. A subsequence of segments is selected from one of the plurality of segment sequences, where the subsequence of segments satisfies the desired compression budget and maximizes a summary score that is a combination of the informativeness score for each segment and the coherence score for the subsequence. The processor generates a summary content item comprised of clips from the audio content item corresponding to the selected subsequence of segments.

In an embodiment, the received audio track is associated with a video content item. In this case, the summary content item further comprises clips of the video content item corresponding to the subsequence of segments.

In an embodiment, determining an informativeness score for each segment in a sequence of the plurality of segment sequences further comprises constructing, by the processor, a graph representing a respective one of the plurality of segment sequences wherein each segment of the segment sequence is a node in the respective graph. The weight of a node in the graph is initially assigned based on position of the corresponding segment in the sequence (i.e., earlier segments have more weight, with exponential decay). The directed edges in the graph link segments later in the sequence to those that occur earlier. The weight of a directed edge is calculated by comparing the distributions of terms in the pair of segments corresponding to the nodes being linked. In one formulation of this comparison, the terms in the vocabulary for a natural language are represented as distinct dimensions in a feature space, and the pair of segments being compared is represented as a pair of vectors in this feature space based on the frequencies of the vocabulary terms in each of the segments (where each frequency is normalized by the number of terms in the segment). The edge weight is then computed as the cosine of the angle between the vectors (expressed as the cosine similarity function).

In order to compute the informativeness score for each segment in a sequence of segments from a plurality of sequences of segments, the salience score for each segment is first computed. To compute the salience score, the weights of nodes in the sequence graph as described earlier are updated based on a Page Rank algorithm that carries out a random walk of the graph. In each iteration of the Page Rank, the weight of each node is updated based on the weights of 'incoming' links from later nodes that point to it, normalized by the weights of 'outgoing' links that it points to. The algorithm has the desirable property of heavily weighting first mentions of a topic, which results in spreading weight across topics, where a segment having a first mention of a topic being ore representative for the topic. The output is an array of salience scores for each segment in the sequence.

In order to complete the computation of the informativeness score for each segment in a sequence of segments from a plurality of sequences of segments, the processor then computes the diversity score for each segment. Instead of Page Rank, the DivRank algorithm is used to carry out a random walk of the graph. When a node is visited often during Page Rank and ends up with a high Page Rank, it can happen that neighbors of that nodes which are also visited, also inherit a high Page Rank. These neighbors, however, may be redundant, and can potentially waste the summary budget with selection of repeated information. In DivRank, instead, frequently visited nodes absorb the weights away from their neighbors, with the desirable property of favoring regions of the graph that are distinct and thus diverse from one another. While in Page Rank, the edge weights do not change with each iteration and only the node weights get updated, in DivRank the diversity is achieved by updating the edge weights (i.e., transition probabilities) in each iteration to reflect how often a particular node has been revisited in the random walk. The output is an array of diversity scores for each segment in the sequence. The informativeness score of each segment is then a weighted combination of its salience score and its diversity score.

An apparatus comprising at least one processor and a storage medium for tangibly storing thereon program logic for execution by the processor is disclosed in an embodiment. The program logic when executed by the processor causes the processor to summarize a received multimedia content item. The program logic comprises, receiving logic, executed by the processor, to receive a content item comprising an audio track as input along with a desired compression budget. Obtaining logic, is executed by the processor, to obtain a time-aligned text transcript of the audio track. The processor executes partitioning logic to partition the text transcript into a plurality of sequences of segments, wherein each sequence of the segments corresponds to a respective series of non-overlapping time intervals different from non-overlapping time interval series of other sequences. Determining logic, is executed by the processor, to determine an informativeness score that combines a salience score and a diversity score for each segment of the plurality of segment sequences. A subsequence of segments from one of the plurality of segment sequences, is selected by the processor by executing selection logic. The subsequence of segments satisfies the desired compression budget and maximizes a combination of the subsequence's coherence score and its informativeness score. The processor generates a summary content item by executing generating logic such that the summary content item is comprised of clips from the audio content item corresponding to the subsequence of segments.

In an embodiment, the determining logic further comprises constructing logic, executed by the processor, for constructing a graph representing a respective one of the plurality of segment sequences wherein each segment of the segment sequence is a node in the respective graph.

A non-transitory computer readable storage medium, comprising instructions, which when executed by a processor cause the processor to summarize a multimedia content item is disclosed in one embodiment. The computer readable medium comprises instructions for the processor to receive a content item comprising an audio track as input along with a desired compression budget. The instructions also cause the processor to obtain a time-aligned text transcript of the audio track and partition the text transcript into a plurality of sequences of segments, wherein each sequence of the segments corresponds to a respective series of non-overlapping time intervals different from non-overlapping time interval series of other sequences of the plurality of segment sequences. An informativeness score is determined based on the instructions, wherein the informativeness score is a combination of a salience score and a diversity score for each segment of the plurality of segment sequences. The instructions also cause the processor to select a subsequence of segments from one of the plurality of segment sequences, the subsequence of segments satisfies the desired compression budget and maximizes a combination of coherence scores of the subsequence and informativeness scores of the segments in the subsequence. A coherence score is determined as a combination of the confidence score of the subsequence (discussed infra) and the weights of discourse features that relate successive terms in the subsequence (e.g., features such as the presence of conjunctions, pronouns, common word-stems, etc.). The processor generates, based on the instructions, a summary content item comprised of clips from the audio content item corresponding to the subsequence of segments.

In an embodiment, the computer readable medium further comprises instructions that cause the processor to determine an informativeness score of each segment of the plurality of segment sequences, where the informativeness score is determined using a supervised machine learning algorithm whose training data comprises transcripts of content items with labels for particular time spans pertaining to each content item, indicating if the particular time span should be included in a summary of the respective content item. The subsequence of segments that are included in a summary of a respective one of the content items is based on a machine-learned regression function that combines weights for each member of a set of features for computing the informativeness score. The feature set includes the segment's Page Rank and DivRank scores), the respective position of a segment in transcript order, terms (comprising words, or word-stems, or phrases) in the segment, length of the segment, similarity between the segment and the preceding and succeeding segments in the sequence (if any), and changes in feature values between the segment and the preceding and succeeding segments in the sequence (if any).

These and other embodiments will be apparent to those of ordinary skill in the art with reference to the following detailed description and the accompanying drawings.

BRIEF DESCRIPTION OF THE DRAWINGS

In the drawing figures, which are not to scale, and where like reference numerals indicate like elements throughout the several views:

FIG. 9 shows the experimental results obtained in an evaluation of the summaries generated by the multimedia summarization system;

DESCRIPTION OF EMBODIMENTS

Figure 1:
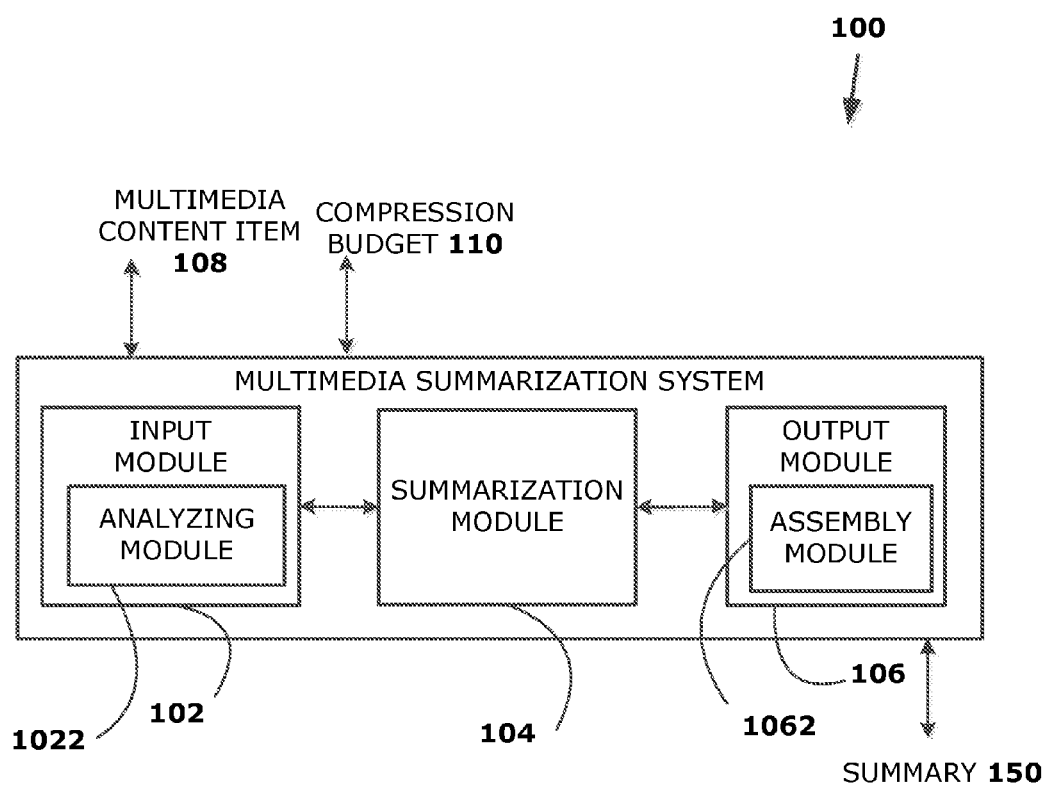
FIG. 1 is a schematic diagram of a multimedia summarization system that produces summaries of multimedia items in accordance with one embodiment.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Embodiments are described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions or logic can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like A communication link may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links, such as may be known to those skilled in the art. Furthermore, a computing device or other related electronic devices may be remotely coupled to a network, such as via a telephone line or link, for example.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Throughout the specification and claims, terms may have nuanced meanings suggested or implied in context beyond an explicitly stated meaning Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In this age of content overload, few people have time to consume extensive audio/video information that is available from the various sources. The time required to listen to audio or watch longer videos to understand their content often deters users from entirely engaging with such content. Currently, users have to inspect the content item at randomly selected time points to determine if it suits their interests and warrants a more extensive review. Moreover, review of large multimedia files such as video content items can pose severe strain on computational resources. These problems can be exacerbated when users interact with resource-intensive content such as videos via mobile devices. In such resource and space constrained environments, providing summaries of multimedia content items is desirable. Users may be encouraged to review a short, condensed summary, the longer version of which they may otherwise ignore thereby resulting in improved user engagement.

The techniques described herein allow multimedia content, such as videos, accessible to the end users in digestible chunks, greatly reducing the storage size of the video and transmission speed across the network. Thus, users of mobile devices can increase their access and consumption of the multimedia content. Turning now to the figures, FIG. 1 is a schematic diagram of a multimedia summarization system 100 that combines features from different media channels in order to produce summaries of multimedia items in accordance with one embodiment. The multimedia summarization system 100 comprises an input module 102, a summarization module 104 and an output module 106 stored in a non-transitory processor-readable storage device. When executed by the processor of a computing device (not shown), these modules receive a content item 108 and produce a multimedia summary 150 of the received content item 108 in accordance with embodiments described herein. If the received content item 108 is a video content item, a video summary 150 comprising portions of the content item 108 that convey the important portions of the content item 108 can be generated. On the other hand, if the received content item 108 is an audio content item, a corresponding audio summary 150 comprising its important portions or highlights can be generated.

The input module 102 receives a multimedia content item 108 such as an audio, a video content item to be summarized. The multimedia content 108 can be received by the input module 102 from both internal and external sources associated with the multimedia summarization system 100. In an embodiment, the multimedia summarization system 100 can be associated with a content provider who receives content from various content partners. Based on the content provider's determination of the length of the content to be presented to the users, the content received from the content providers can be summarized in accordance with embodiments described herein. In an embodiment, the multimedia summarization system 100 can be made available to users in general, for example, via a publicly accessible server. The multimedia content 108 may thus include amateur or professionally generated content in any format. By the way of illustration and not limitation, the received content item 108 can pertain to, news, meetings, and videos of events, movies, radio programs or other recordings. In addition, the multimedia content 108 can be of any format.

The input module 102 can also receive a compression budget 110 for the multimedia content item 108. The compression budget 110 can include the extent to which the multimedia content item 108 is to be summarized. The compression budget 110 can be received in terms of different criteria. In an embodiment, the compression budget 110 can be expressed as a percentage of the total running time of the received content item 108. The compression budget 110 can also be expressed in terms of the actual running time of the summary 150. Thus, if the compression budget 110 is received as a percentage, the input component 102 can be configured to calculate the total running time for the summary 150 and transmit it to other modules of the multimedia summarization system 100.

In an embodiment, the input module 102 comprises an analyzing module 1022 that analyzes the received multimedia content 108 to determine if it can be summarized. If the received content item 108 can be summarized, it is transmitted to the summarization module 104. If the received content item 108 cannot be summarized, a null result is returned. In an embodiment, the analyzing module 1022 comprises a statistical classifier. The classifier can be trained on summarizability labels provided by humans. It is based on a simple linear regression model that takes the length of the content item, source and various coarse-grained features for video and audio quality (such as the bitrate or whether speech is present) into account.

If it is determined that the received content item 108 can be summarized, the content item 108 along with the compression budget 150 is transmitted by the input module 102 to the summarization module 104. The summarization module 104 processes the received content item 108 in accordance with the various procedures as described herein to identify portions of the content item 108 to be included in the summary 150. In an embodiment, the summarization module 104 can be configured to provide a series of time intervals corresponding to the portions of the received content item 108 that are to be included in the summary 150. In an embodiment, the summarization module 104 can provide the portions of the received content item 108 to be included in the summary 150. The series of time intervals or portions of the received content item 108 are identified such that the resultant summary 150 conforms to the compression budget 110 provided with the content item 108.

The output module 106 receives one of the series of time intervals corresponding to the portions of the received content item 108 or the portions of the received content item 108 to generate the summary 150. In an embodiment, the series of time intervals can be in the form of a sequence of non-contiguous, non-overlapping sub-intervals of equal lengths. Each subinterval has a start-time and an end-time that corresponds to a clip or a portion of the received content item 108. In an embodiment, the output module 106 can further comprise an assembly module 1062 that receives the time intervals. The assembly module 1062 generates a new content item by stitching together the segments or clips of the content item 108 that correspond to the time intervals thereby generating the summary 150 which is returned to a requesting entity. In an embodiment, the stitching can comprise more than just concatenation of content clips related to the subintervals. It can comprise, for example, transitions to smooth the junctures between video segments or even insertion of additional content such as advertisements.

In an embodiment, additional sources of information including closed-captioning and meta information associated with a content item can be used for summary generation in accordance with some embodiments described herein. For example, in the case of content items which may include songs, methods as described herein can be applied based on any closed-captioning data available for the content. By the way of illustration and not limitation, the additional sources of information can comprise audio processing components that recognize instances of laughter, clapping, etc. and video processing components that carry out boundary shot detection on video content, topic labels or tags associated with the content item 108.

Figure 2:
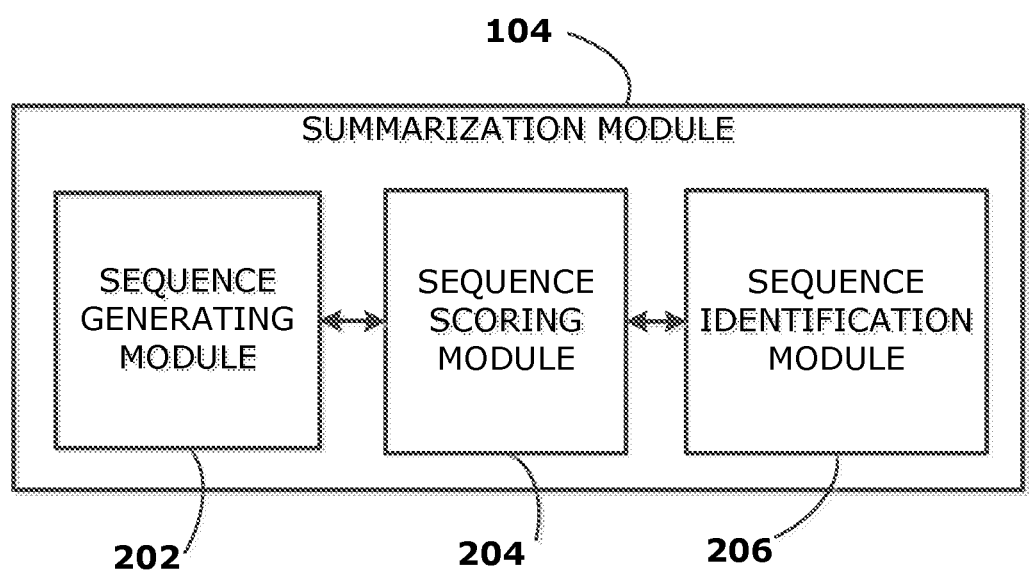
FIG. 2 shows the sub-modules of the summarization module in accordance with one embodiment.

FIG. 2 shows the sub-modules of the summarization module in accordance with one embodiment. The sub-modules comprise, a sequence generating module 202, a sequence scoring module 204 and a sequence identification module 206. The sequence generating module 202 receives the content item 108 upon the determination that it is summarizable and processes it to generate a plurality of segment sequences. Each sequence comprises segments of audio data corresponding to a respective series of contiguous, non-overlapping time intervals. The plurality of segment sequences thus generated are processed by the sequence scoring module 204 to compute an informativeness score for a segment and a coherence score for a sequence in accordance with embodiments detailed further infra. In an embodiment, the informativeness score for each segment comprises a combination of a salience score and a diversity score. The plurality of segment sequences along with their respective informativeness scores for each sequence segment are transmitted to the sequence identification module 206. The sequence identification module 206 is configured to identify and select a subsequence of segments from one of the plurality of segment sequences that satisfies the compression budget 110 while maximizing the informativeness and coherence scores. The selected subsequence of segments is transmitted to the output module 106 for the generation of the summary 150 as described herein.

Figure 3:
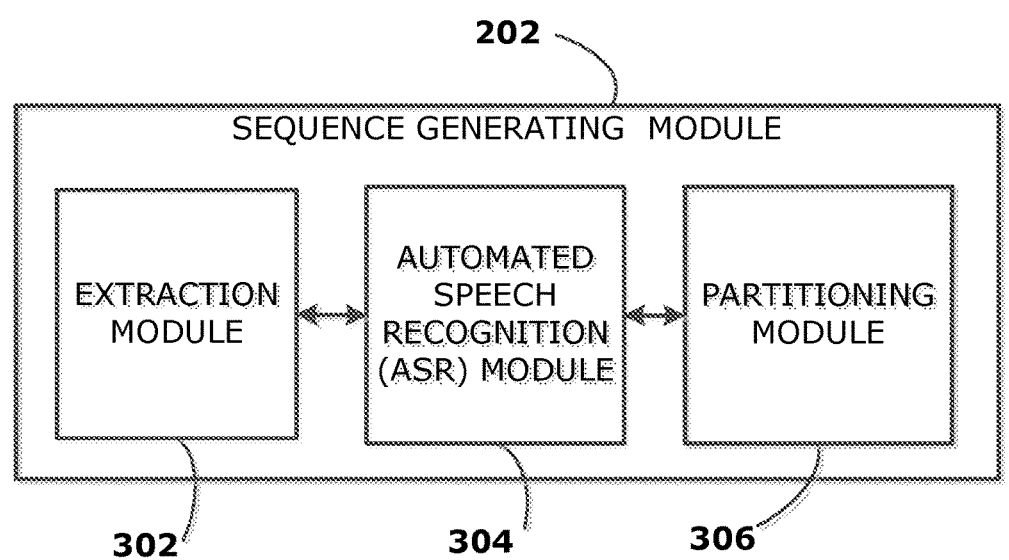
FIG. 3 illustrates a block diagram of the sequence generating module in accordance with one embodiment.

FIG. 3 illustrates a segment diagram of the sequence generating module 202 in accordance with one embodiment. As described supra, the sequence generating module 202 is configured to generate a plurality of segment sequences from the received content item 108. The sequence generating module 202 comprises an extraction module 302, an automated speech recognition (ASR) module 304 and a partitioning module 306. If the received content item 108 is an audio-only content item, it may be directly provided to the ASR module 304 without any action by the extraction module 302. If the received content item 108 also includes video content, the audio from the content item 108 is ripped by the extraction module 302 and such audio is provided to the ASR module 306. In an embodiment, the extraction module 302 can comprise an open source tool such as the VLC tools.

The ASR module 304 receives the audio input either directly or via the extraction module 302 and generates a text transcript of the received audio file. The output of the ASR module 304 comprises a text transcript of a standard form used by media players. In an embodiment, the transcript is associated with a word lattice that is then reduced to a Word Confusion Network (WCN). This network can be viewed as a graph of all distinct utterances possible within each successive time interval, along with their associated probabilities. Characteristics of spoken language such as pauses, hesitations, corrections, back-channel utterances and the like are part of the word information in the WCN. Thus, the ASR module 304 can hypothesize multiple alternatives for each audio segment along with a confidence score per alternative. In an embodiment, there may be no alternative segments hypothesized for a segment and hence, so a uniform confidence score is provided. In an embodiment speaker identifiers can be inferred by the ASR module 3204 via mapping particular speakers to respective identifiers. In an embodiment, the text transcript generated by the ASR module may not distinguish between different speakers or if a speaker has changed. In an embodiment, a time-aligned text transcript of the received content item 108 is generated so that each audio segment has a time interval associated with it.

The partitioning module 306 receives the text transcript from the ASR module 304 and divides it into a plurality of contiguous text segment sequences corresponding to time intervals marked by their respective start and end times. In one embodiment, the text segments of each sequence have the same size so that segments from different sequences having different sizes. It may be appreciated that the segment sizes for the various sequences need to be optimized for coherence and informativeness. Smaller size segments provide potentially more control over informativeness but assembling a larger number of segments together for the summary 150 can compromise coherence.

It may be appreciated that while the extraction module 302 and the ASR module 304 are shown as part of the sequence generating module 202, it may be appreciated that this is not necessary and that one or more of these modules may be remote from the multimedia summarization system 100 and accessible via a network. For example, the ASR module 304 can comprise open source tools such as, Sphinx, HTC and the like.

In an embodiment, the computer readable medium further comprises instructions that cause the processor to determine an informativeness score of each segment of the plurality of segment sequences, where the informativeness score is determined using a supervised machine learning algorithm such as, regression models based on simple linear regression or support-vector-machine regression with linear or non-linear kernels. The informativeness score of a segment reflects the probability that the segment belongs in the summary 150. The training data for the machine learning algorithm comprises transcripts of content items with labels for particular time spans pertaining to each content item, indicating if the particular time span should be included in a summary of the respective content item. The subsequence of segments that are included in a summary of a respective one of the content items is based on a machine-learned regression function that combines weights for each member of a set of features for computing the informativeness score. The feature set includes the segment's Page Rank and DivRank scores), the respective position of a segment in transcript order, terms (comprising words, or word-stems, or phrases) in the segment, length of the segment, similarity between the segment and the preceding and succeeding segments in the sequence (if any), and changes in feature values between the segment and the preceding and succeeding segments in the sequence (if any).

Figure 4:
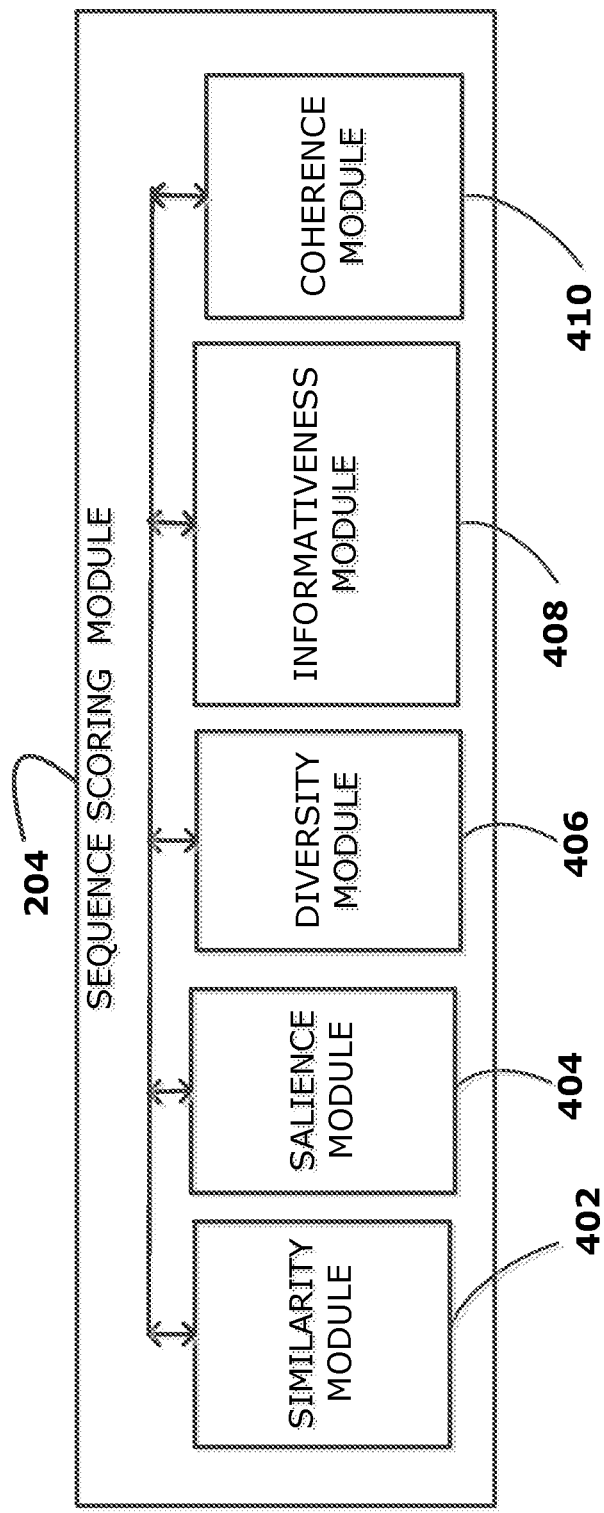
FIG. 4 shows the details of the sequence scoring module in accordance with this embodiment.

In an embodiment, no training data is used and hence an unsupervised machine learning methodology is implemented. FIG. 4 shows the details of the sequence scoring module 204 in accordance with this embodiment. The sequence scoring module 204 comprises a similarity module 402, a salience module 404, a diversity module 406 and an informativeness module 408. The plurality of segment sequences from the sequence generating module 202 are transmitted for scoring to the sequence scoring module 204. In an embodiment, each of the segment sequences can be represented as a graph wherein each segment is represented as a node of the graph and the directed edges between later nodes and earlier ones in the sequence represent links between them. To compute the weight of an edge between two nodes, the cosine similarity of the segments associated with the nodes has to be calculated. Accordingly, the similarity module 402 is configured to determine tf.idf term weights of the terms associated with each node (i.e., with each segment) and a cosine similarity calculation between segments is carried out. In some embodiments, the terms can be truncated to correspond to stems, so that frequency counts are higher than those of words that map to the same stem. In some embodiments, the features are semantic ones where the terms in the segment are extended to synonymous terms found in a thesaurus or found by a statistical measure of strength of association in a large collection.

In an embodiment, the similarity values between the various nodes as determined by the similarity module 402 are accessed by the salience module 404 in order to calculate a salience score for each segment represented as a node in a graph. To compute the salience score, the weights of nodes in the sequence graph as described earlier are updated based on a Page Rank algorithm that carries out a random walk of the graph. The weight of a node in the graph is initially assigned based on position of the corresponding segment in the sequence (i.e., earlier segments have more weight, with exponential decay). In each iteration of the Page Rank, the weight of each node is updated based on the weights of 'incoming' links from later nodes that point to it, normalized by the weights of 'outgoing' links that it points to, with a renormalization to represent transition probabilities. The output is an array of salience scores for each segment in the sequence.

In an embodiment, the diversity module 406 determines the diversity score for each of the nodes in the graph. The DivRank algorithm is used in a random walk on the graph similar to Page Rank except that at each iteration, the diversity is achieved by updating not only the node weights as in Page Rank but also the edge weights (i.e., transition probabilities) to reflect how often a particular node has been revisited in the random walk. The output is an array of diversity scores for each segment in the sequence. Including diversity in the computations for generating the summary 150, results in non-redundant regions of the content item 108 being favored.

The informativeness module 408 combines the salience score and the diversity score for each node (or segment). In an embodiment, the salience and diversity scores make equal contributions to the final informativeness score. In an embodiment, the salience and the diversity scores can be combined so that one score is weighted more heavily than the other. The parameters for combining the two scores can also be learnt via machine learning. The informativeness module 408 can be trained to apply appropriate parameters for combining the salience and diversity scores via supervised data which comprises parameters as set by human trainers.

Each of the segments sequences are also scored for coherence by the coherence module 410 as detailed herein. The coherence of a sequence can be computed using weights for contiguity in transcript order and the time duration of the segments. In an embodiment, speaker change (if available) can also be used. In another embodiment, the presence of particular terms like pronouns or subordinating conjunctions can also be used. In another embodiment, general text segmentation techniques, such as TextTiling, based on segment similarity can be used to find coherence gaps in the segments. In an embodiment, coherence weights can be trained from a corpus.

Figure 5:
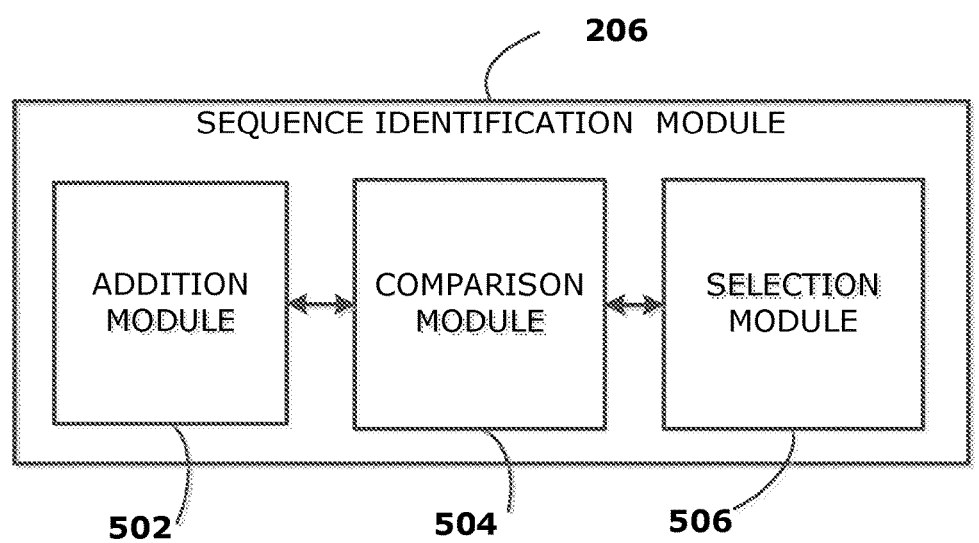
FIG. 5 shows the details of the sequence identification module in accordance with this embodiment.

FIG. 5 is a block diagram showing the details of a sequence identification module 206 in accordance with one embodiment. The informativeness scores generated by the sequence scoring module 204 for the segments in the sequences are received by the sequence identification module 206. The segments in each of the sequences are added up by the addition module 502 to the target length based on the coherence score and compression budget 110 as detailed infra. The scores of the plurality of segment sequences are compared by the comparison module 504. The segment sequence having the highest score is selected by the selection module 506 for generating the summary 150.

In one embodiment, summarization is mathematically dealt with as an optimization problem. In a further embodiment, the methods disclosed herein are applied to text transcripts of audio tracks. A text is considered in this embodiment as a sequence of sentences V. Given a budget of length L words, the summarizing module 104 is configured to find a subsequence S of V that maximizes the function F(S) such that length(S) is approximately equal to L. If F is monotone submodular, the problem can be solved using a greedy algorithm near optimally. To solve this problem, F is decomposed into relevant features, reflecting informativeness (comprising aspects of salience and diversity) and coherence, based on relations between successive words that characterize the coherence of the subsequence S. The coherence of a subsequence S is a function, detailed infra, of the confidence of S and the weights of discourse features that relate successive terms in the subsequence (e.g., features such as the presence of conjunctions, pronouns, common word-stems, etc.).

If V is the time interval for the content item 108 and $L_T$ is the compression budget, for example, in seconds a greedy approach can be used for partitioning the content item 108 in accordance with embodiments described herein. A set of segment sizes B for the content item 108, is determined as shown below based on the number of iterations $\lambda_1$ and size adjustment parameter $\lambda_2$.

Figure 6:
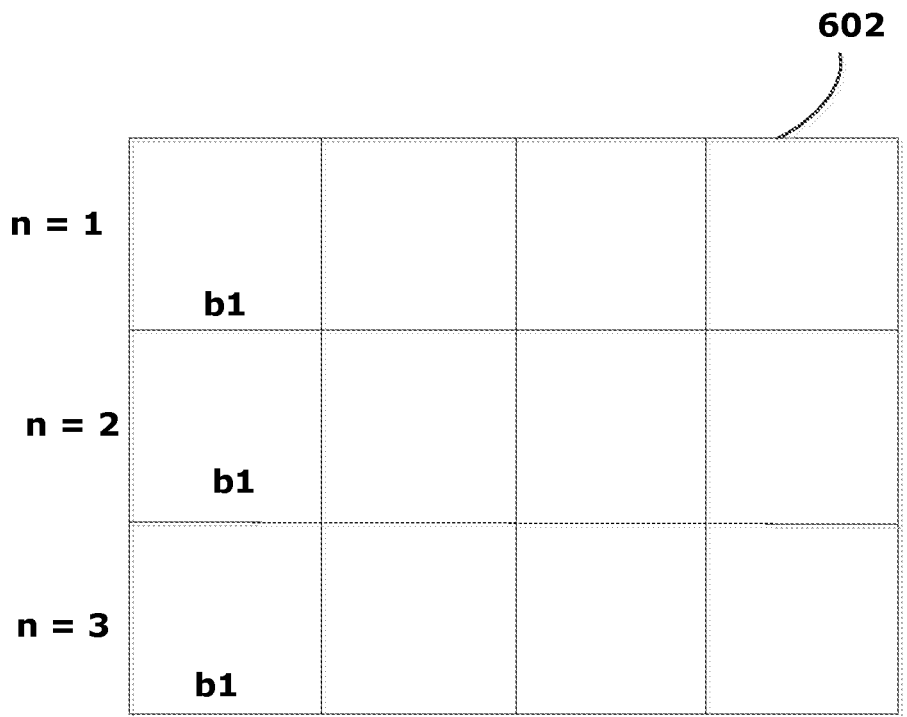
FIG. 6 illustrates an embodiment of two different partitionings of the content item in accordance with one embodiment.
Figure 6:
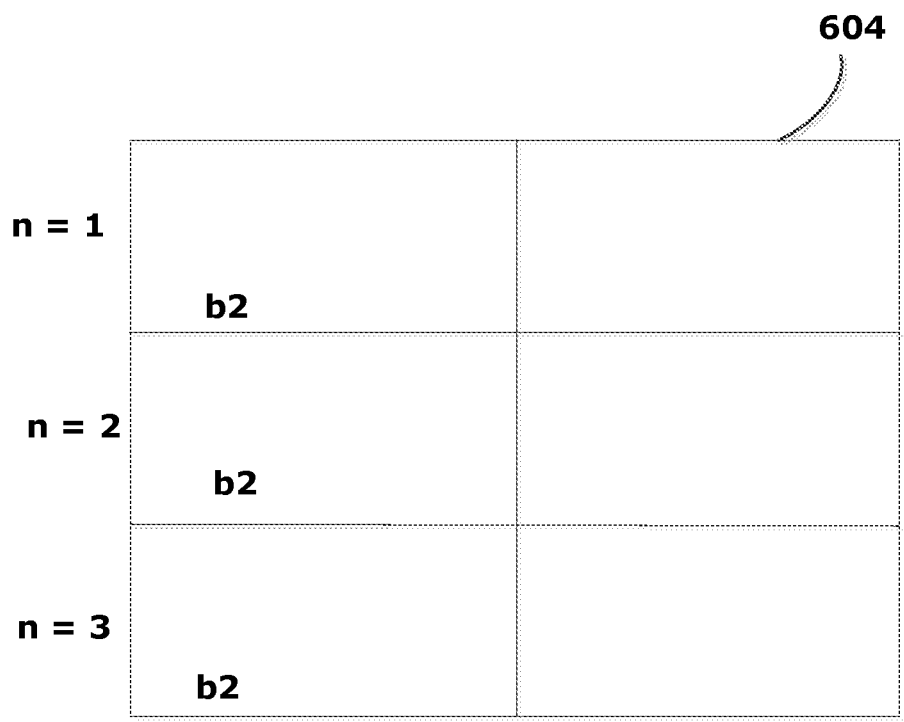

For i=1 to $\lambda_1$ do
BlockSizes:-{int($\lambda_2 *|L_T|/i$)}∪BlockSizes
done
Return BlockSizes FIG. 6 illustrates an embodiment of two different partitionings of the content item 108 in accordance with one embodiment. At 602, the content item 108 is partitioned into a sequence of segments of size b1. At 604 the content item 108 is partitioned into a sequence of segments of size b2. As seen from FIG. 6, each partitioning has three different layers corresponding to n=1, n=2 and n=3 in the WCN for each segment. The segment sizes as determined herein can be further adjusted slightly so that they do not end right after an inferred pause boundary. In order to obtain the summary 160, Equation (1) shown below is solved for each layer n in each refined partitioning. This corresponds to filling in scores for all of the segments in FIG. 6 and the top scored segments are greedily selected up to length $|L_T|$.

When the above procedure is employed by the summarization module 104 for the audio transcript of the content item 108, fixed-size segments of audio as shown above are used. Accordingly, if V is the time interval (in seconds) or the total running time of the content item 108, S is the sub-interval of V (S⊆V), b is a segment size in seconds chosen from a set B of segment sizes and n be the segment b's nth-ranked WCN hypothesis, then the summary as generated by the multimedia summarization system 100 should satisfy the Eq. (1) shown below:)

$$S^* \in \text{argmax}_{b \in B, s_{bn} \leq V} F(S_{bn}) \text{ where } |S_{bn}| \approx L_T \quad \text{Eqn. (1)}$$

$S_{bn}$ is a subinterval of V of size b and ASR rank n and where $F:2^V \rightarrow \{0, 1\}$ such that:

$$F(S_{bn}) = \left( \frac{\lambda_3}{|S_{bn}|} \sum_{x \in S_{bn}} Sal(x) \right) + \left( \frac{\lambda_3}{|S_{bn}|} \sum_{x \in S_{bn}} Div(x) \right) + \lambda_5 Coh(S_{bn}) \quad \text{Eqn. (2)}$$

$$Coh(S_{bn}) = \lambda_6 Conf(S_{bn}) + \lambda_7 \sum_{i=1}^{|S_{bn}|-1} \sum_{j=1}^{m} \sigma_j(w_i, w_{i+1}) \quad \text{Eqn. (3)}$$

In Eq. (3) Coh is the Coherence of the sequence corresponding to the subinterval $S_{bn}$, and Conf is the confidence of the nth-ranked Word Confusion Network (WCN) hypothesis for $S_{bn}$, and the $\sigma_{1\ldots m}$ are discourse features (e.g., presence of conjunctions, pronouns, common word stems, etc.) relating successive word pairs (bigrams) ($w_i$, $w_{i+1}$) in $S_{bn}$. The λ's in Eqns. (2) and (3) are tuning parameters that can be set heuristically or else learned from training data using a supervised machine learning algorithm of the sort mentioned supra. It may also be noted that as discussed supra, segment size variation and segment partitioning also contributes to coherence.

Sal or Salience in Eq. (2) is calculated as a Page Rank:

$$Sal(u) = (1-\lambda_8) + \lambda_8 \sum_{v \in IN(u)} p_0(u,v) \frac{Sal(v)}{\sum_{w \in OUT(v)} p_0(v,w)} \quad \text{Eqn. (4)}$$

where u and v are graph nodes corresponding to segments and $\lambda_8$ is the damping factor. Again as discussed supra, each segment is represented as a node in a graph corresponding to the sequence of segments of a equal width and is weighted based on the transition probability $p_0(u, v)$ from node u to node v of 'incoming' (IN) links from later segments that point to it normalized by the weights of outgoing (OUT) links that it points to.

For the Salience calculation as shown in Eq. (4), the transition probability (edge weight from one node to another) remains stationary over time. In contrast, Div in Eq. (4) yields the diversity score DivRank, which is an extension to Page Rank that reinforces transition probabilities to the node based on the number of times the node is visited. In Eq. (5) shown below which is used for computing the diversity score, the transition probability (edge weight) from a node u to a node v at time t is dependent on (i) the prior probability of visiting node v, p*(v) (which is the same as the Page Rank jump probability if the prior is uniform) as well as (ii) the static transition probability $p_0(u, v)$ from node u to node v prior to any reinforcement, times $N_T(v)$, which is the number of times the vertex v has been visited at time T.

$$p_T(u,v) = (1-\lambda_8)p^*(v) + \lambda_8 \frac{N_T(v) * p_0(u,v)}{\sum_{w \in V} N_T(w) * p_0(u,w)} \quad \text{Eqn. (5)}$$

Figure 7:
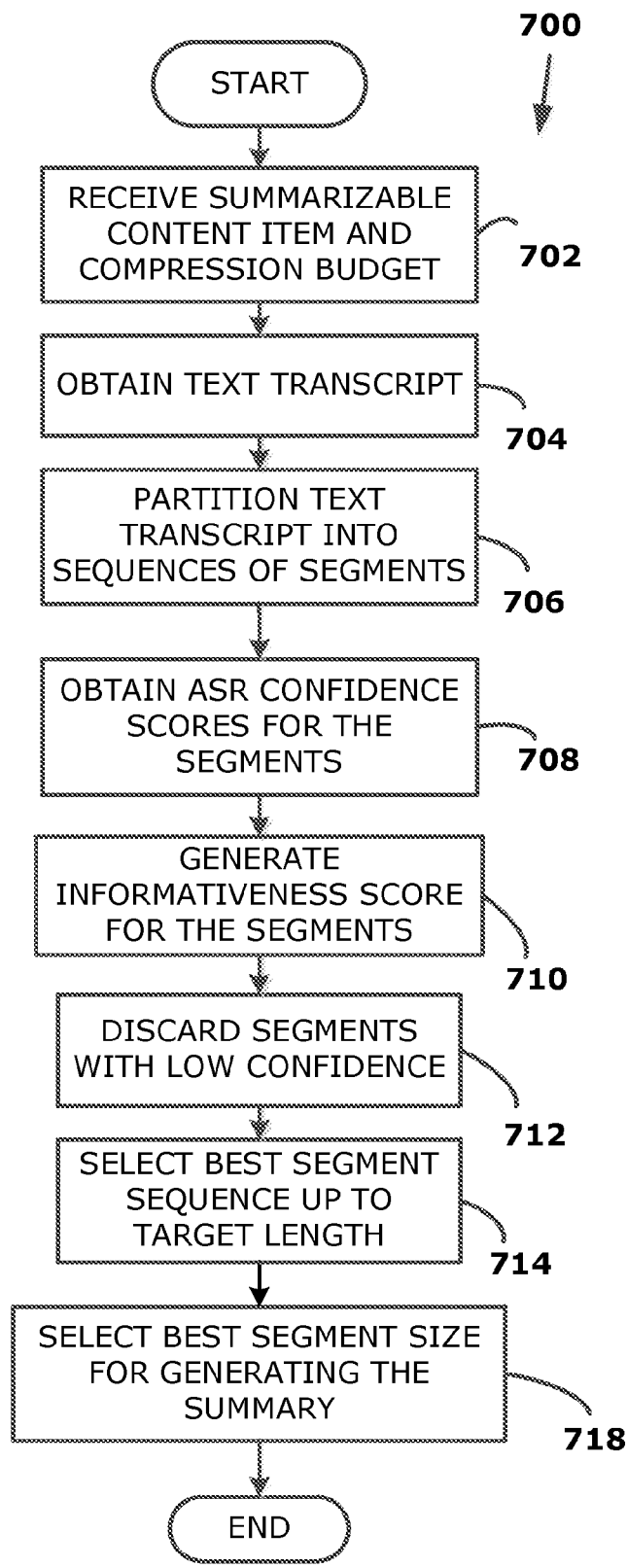
FIG. 7 shows a flowchart that details a method of generating a summary for a multimedia content item in accordance with embodiments described herein.

FIG. 7 shows a flowchart 700 that details a method of generating a summary for a multimedia content item 107 in accordance with embodiments described herein. The method begins at 702 wherein a summarizable multimedia content item 702 is received in addition to a desired level of compression or compression budget for a summary. The compression budget may be expressed either in terms of the fraction of the total running time of the actual content item 107 or in terms of the absolute running time (in terms of seconds, minutes and the like) for the summary 150. A received content item may not be summarizable if, for example, the compression budget is above the total running time of a received content item or over a certain threshold fraction of the total running time of the actual content item 107. In this case, generating the summary may be more expensive and hence a received content item may be rejected as not being summarizable. Hence, the content item 107 and the desired compression rate or desired level of compression or compression budget is received at 702 after a pre-processing that determines if the content item 107 is summarizable.

At 704, a text transcript is obtained from the ASR module 304 via processing of the audio portion of the content item 107 and the text transcript thus obtained is partitioned into sequences of segments at 706. The segments in a particular sequence have respective fixed and equal widths (i.e., block size) different from segments of other sequences. In an embodiment, multiple hypotheses can be generated with the text transcript by the ASR module 304. Accordingly, multiple layers can be generated at 706 for different ASR hypotheses for each segment. At 708 the ASR confidence scores are obtained. It can be appreciated that 708 can be omitted if only a single hypothesis is generated by the ASR module 304. At 710 the informativeness scores comprising a combination of the salience score and the diversity score are obtained for the segments in each of the segment sequences. At 712, segments with low WCN confidence scores are discarded. At 714, segments are added so that the resulting sequence has the highest combination of informativeness and coherence scores per Eqn. (2), until the target length condition is satisfied. The result is a best candidate summary subsequence for the particular block size. When the compression budget is expressed in terms of the actual running time for the summary 150, the target length will be equal to the compression budget. However, if the compression budget is expressed as a fraction, then:

Target length (in time units)=compression budget*total running time of content item 107.

At 716, the candidate summary subsequences (each with a different block size) are compared and the subsequence with the highest score is selected for generating the summary. In an embodiment, the start and end times of each of the segments in the selected segment subsequence is transmitted to an assembly module 1072 for the generation of the summary content item 150.

Figure 8:
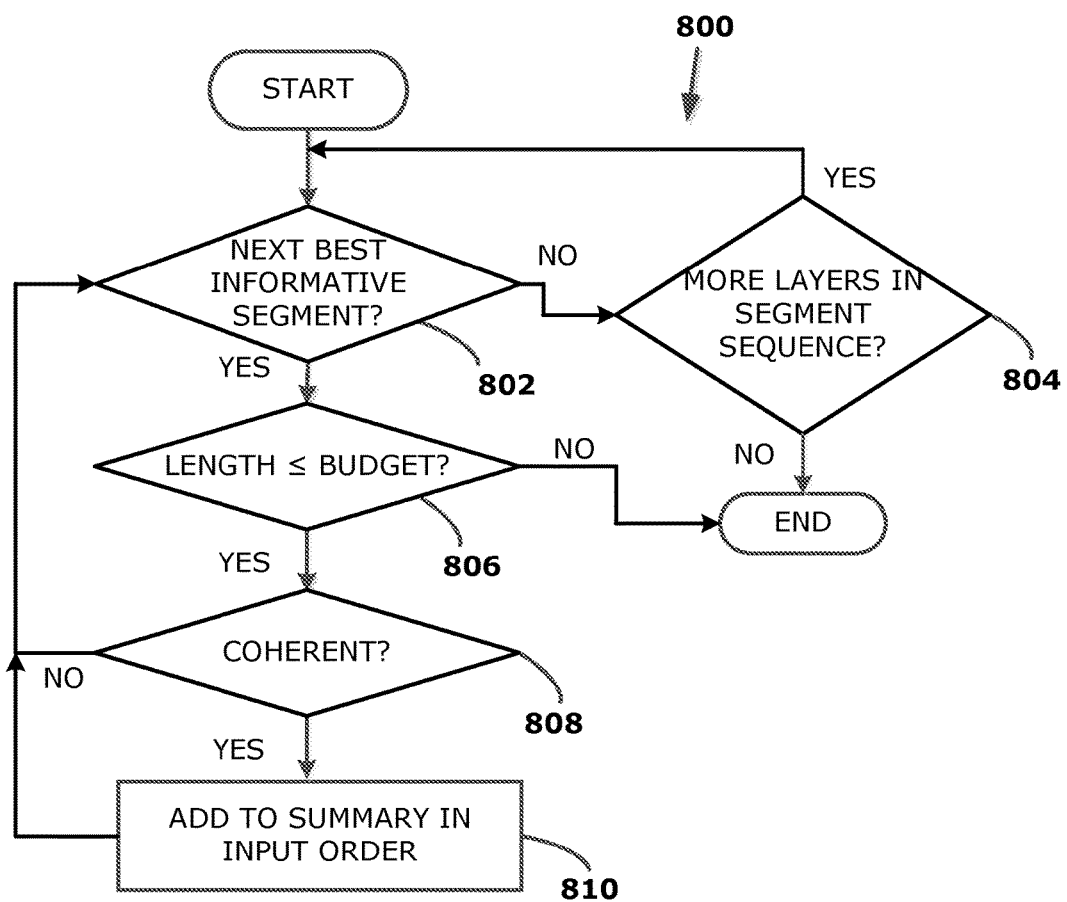
FIG. 8 shows a flowchart detailing a method of obtaining informativeness and coherence scores for the segments in a sequence of segments having a fixed width in accordance with one embodiment.

FIG. 8 shows a flowchart 800 detailing a method of obtaining the best candidate summary subsequence for each particular block size from a sequence in accordance with one embodiment (of step 714 in FIG. 7). The method begins at 802 wherein a candidate segment is selected from the sequence based on the informativeness scores. If no segments are left in the current layer for selection at 802, the method moves to 804 wherein the criteria for high ASR confidence is lowered and the candidate at that block address (i.e., time interval) in the next layer from the WCN is chosen (e.g., the layer drops from n=1 to n=2, etc.). If no layers in a particular sequence of segments remain, the method terminates on the end block.

If a candidate segment is selected at 802, the length of the next candidate is added to the current summary output length and tested for whether the total is within the length budget as shown at 806. If at 806, it is determined that the length over the compression budget 110, it indicates that the segments required for constructing the summary have been selected for that particular sequence of segments and hence, the method terminates on the end block. If at 806, it is determined that the length is less than or equal to the compression budget 110, the method determines the coherence of the summary that would result if the next candidate is added to the summary as shown at 808. At 810 the candidate segment is added to the summary in input order and the method returns to 802 for selecting the next informative segment for processing as detailed herein. The method terminates if there is no next most informative candidate segment at 802, at which point the summary, if any, is output.

FIG. 9 shows the experimental results obtained in an evaluation of the summaries generated by the multimedia summarization system 100. A test set of source video items was created and summaries for the test set were generated in accordance with the various embodiments detailed herein. The summaries generated by the multimedia summarization system 100 for a compression budget of 10% were scored by auto-comparing informativeness of transcripts of the system-summarized segments with transcripts of human-summarized video items using the ROUGE (Recall-Oriented Understudy for Gisting Evaluation) method. It computes the score shown below in Eqn. 6:

$$ROUGE_N = \frac{\sum_{S \in REF} \sum_{gram_n \in S} Count_{match}(gram_n)}{\sum_{S \in REF} \sum_{gram_n \in S} Count(gram_n)} \quad \text{Eqn. (6)}$$

In Eqn. 6, let the human summaries be the set REF; the numerator counts n-grams that occur in both the system and human summary, while the denominator counts n-grams that occur in the human summary. Here ROUGE-1 considers n-grams which are unigrams whereas ROUGE-SU4 considers bigrams with internal gaps of up to 4 words. FIG. 8 shows Precision, Recall, and F-measure for summaries of the source videos generated by the multimedia summarization system 100 in accordance with embodiments described herein. As seen from FIG. 8, the informativeness of summarization can further improve with curated transcripts of the speech in the audio when compared with transcripts generated via ASR.

Generally, in order to get from audio to natural language, ASR must be availed of. However, ASR quality can be poor, as it is highly dependent on training data in the domain of the input audio. Further, audio output can be degraded by poor audio recording technologies, microphone quality, and ambient noise during recording, etc. The result is poor confidences associated with parts of the ASR output. Embodiments of the multimedia summarization system 100 as disclosed herein are therefore configured to be highly noise-tolerant.

The content items summarized by the embodiments disclosed herein can come from any source and is not restricted to news, meetings, videos tied to certain events, etc. This can cause problems for more advanced natural language techniques beyond finding words, as sentences may not be recognizable and thus traditional approaches to summarization based on deeper natural language processing (NLP) may not be suitable. Thus embodiments disclosed herein do not avail of such advanced NLP elements that identify parts-of-speech, sentences, syntactic structure, or particular conversational moves. As a result the multimedia summarization system 100 as disclosed herein is configured for processing various types of data (data heterogeneity).

Moreover, it may be appreciated that the multimedia summarization system 100 need not be restricted to any one language and is multilingual. To the extent that the ASR is available for a foreign language, audio in that language may be available, and the summarization techniques as detailed herein are largely language-neutral, except for language-specific lexical features in the Coherence scoring. Moreover, various embodiments disclosed herein are configured to combine machine-judged informativeness (how well the summary covers the content in the input) with machine judged coherence (how well the summary reads).

Figure 10:
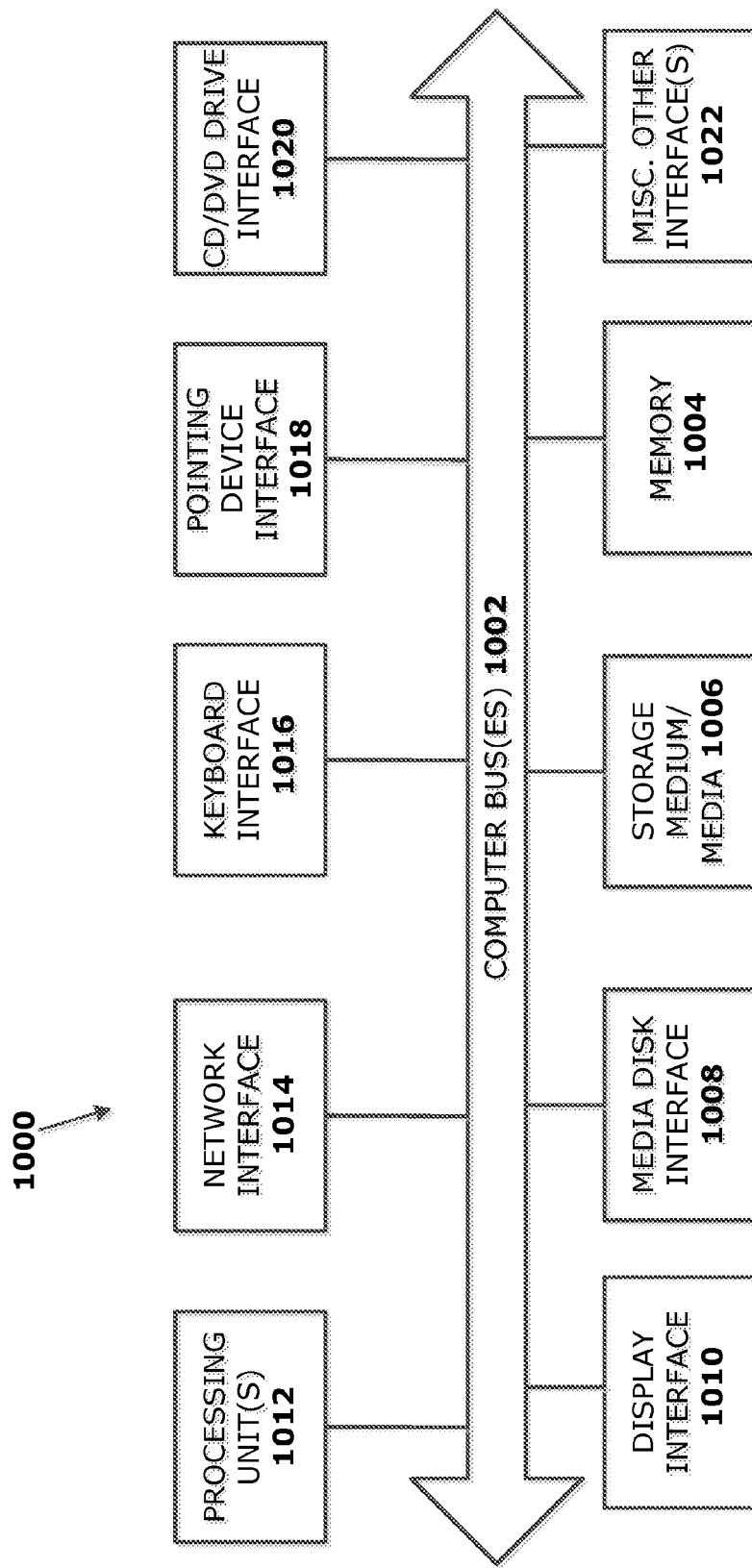
FIG. 10 illustrates internal architecture of a computing device in accordance with embodiments described herein.

As shown in the example of FIG. 10, internal architecture of a computing device 1000 includes one or more processing units (also referred to herein as CPUs) 1012, which interface with at least one computer bus 1002. Also interfacing with computer bus 1002 are persistent storage medium/media 1006, network interface 1014, memory 1004, e.g., random access memory (RAM), run-time transient memory, read only memory (ROM), etc., media disk drive interface 1008, an interface 1020 for a drive that can read and/or write to media including removable media such as floppy, CD-ROM, DVD, etc., media, display interface 1010 as interface for a monitor or other display device, keyboard interface 1016 as interface for a keyboard, pointing device interface 1018 as an interface for a mouse or other pointing device, and miscellaneous other interfaces 1022 not shown individually, such as parallel and serial port interfaces, a universal serial bus (USB) interface, and the like.

Memory 1004 interfaces with computer bus 1002 so as to provide information stored in memory 1004 to CPU 1012 during execution of software programs such as an operating system, application programs, device drivers, and software modules that comprise program code or logic, and/or computer-executable process steps, incorporating functionality described herein, e.g., one or more of process flows described herein. CPU 1012 first loads computer-executable process steps or logic from storage, e.g., memory 1004, storage medium/media 1006, removable media drive, and/or other storage device. CPU 1012 can then execute the stored process steps in order to execute the loaded computer-executable process steps. Stored data, e.g., data stored by a storage device, can be accessed by CPU 1012 during the execution of computer-executable process steps.

Persistent storage medium/media 1006 is a computer readable storage medium(s) that can be used to store software and data, e.g., an operating system and one or more application programs. Persistent storage medium/media 1006 can also be used to store device drivers, such as one or more of a digital camera driver, monitor driver, printer driver, scanner driver, or other device drivers, web pages, content files, metadata, playlists and other files. Persistent storage medium/media 1006 can further include program modules/program logic in accordance with embodiments described herein and data files used to implement one or more embodiments of the present disclosure.

Figure 11:
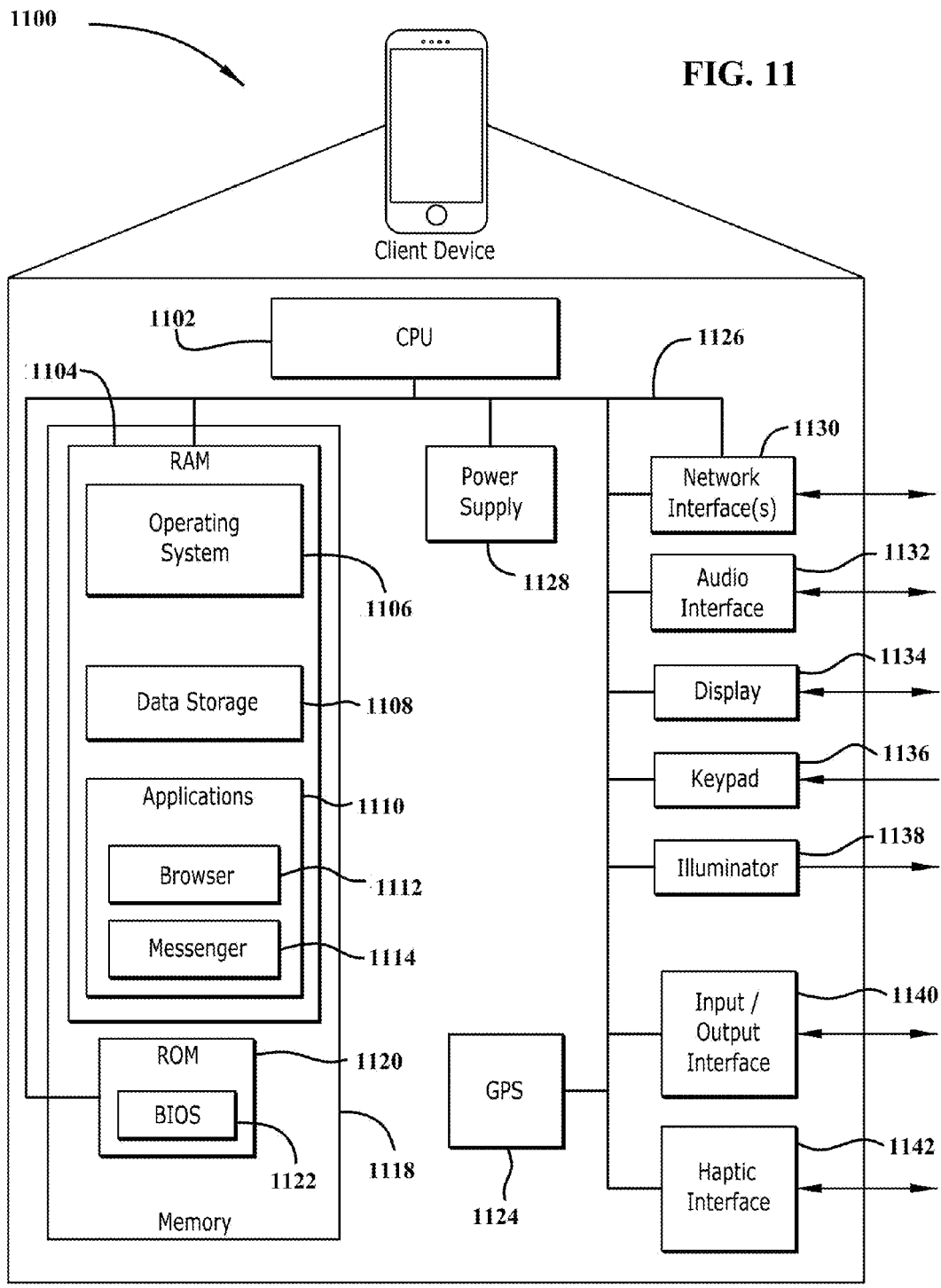
FIG. 11 is a schematic diagram illustrating a client device implementation of a computing device in accordance with embodiments of the present disclosure.

FIG. 11 is a schematic diagram illustrating an implementation of a computing device in accordance with embodiments of the present disclosure. A computing device 1100 capable of sending or receiving signals, such as via a wired or a wireless network, and capable of running application software or "apps" 1110. A computing device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

The computing device 1100 may vary in terms of capabilities or features. The computing device or a user device can include standard components such as a CPU 1102, power supply 1128, a memory 1118, ROM 1120, BIOS 1122, network interface(s) 1130, audio interface 1132, display 1134, keypad 1136, illuminator 1138, I/O interface 1140 interconnected via circuitry 1126. Claimed subject matter is intended to cover a wide range of potential variations. For example, the keypad 1136 of a cell phone may include a numeric keypad or a display 1134 of limited functionality, such as a monochrome liquid crystal display (LCD) for displaying text. In contrast, however, as another example, a web-enabled computing device 1100 may include one or more physical or virtual keyboards 1136, mass storage, one or more accelerometers, one or more gyroscopes, global positioning system (GPS) 1124 or other location identifying type capability, Haptic interface 1142, or a display with a high degree of functionality, such as a touch-sensitive color 2D or 3D display, for example. The memory 1118 can include Random Access Memory 1104 including an area for data storage 1108.

The computing device 1100 may include or may execute a variety of operating systems 1106, including a personal computer operating system, such as a Windows, iOS or Linux, or a mobile operating system, such as iOS, Android, or Windows Mobile, or the like. A computing device 1100 may include or may execute a variety of possible applications 1110, such as a client software application 1114 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. The computing device 1100 may also include or execute an application to communicate content, such as, for example, textual content, multimedia content, or the like. The computing device 1100 may also include or execute an application to perform a variety of possible tasks, such as browsing 1112, searching, playing various forms of content, including locally stored or streamed content, such as, video, or games (such as fantasy sports leagues). The foregoing is provided to illustrate that claimed subject matter is intended to include a wide range of possible features or capabilities.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
   receiving, by a processor, a content item comprising an audio track as input along with a desired compression budget corresponding to a target length of a summary of the content item;
   obtaining, by the processor, a time-aligned text transcript of the audio track via automatic speech recognition;
   partitioning, by the processor, the text transcript into a plurality of sequences of segments, wherein each sequence of the segments corresponds to a respective series of non-overlapping time intervals corresponding to respective clips of the received content item;
   determining, by the processor, an informativeness score comprising a salience score and a diversity score for each segment of the plurality of segment sequences;
   selecting, by the processor, a subsequence of segments from one of the plurality of segment sequences, the subsequence of segments satisfies the desired compression budget corresponding to the target length and maximizes a combination of coherence and informativeness based on the salience and diversity scores; and
   generating, by the processor, a summary content item comprised of the respective clips from the received content item corresponding to the subsequence of segments.

2. The method of claim 1, wherein the received audio track is associated with a video content item.

3. The method of claim 2, wherein the summary content item further comprises clips of the video content item corresponding to the subsequence of segments.

4. The method of claim 1, wherein, the informativeness score indicates a probability that a respective segment belongs in the summary content item.

5. The method of claim 4, wherein the informativeness score of each segment is determined based on training data using a machine learning algorithm, the training data comprises transcripts of content items with labels for particular time spans in the content items indicating if the particular time span should be included in a summary of the respective content item.

6. The method of claim 5, the segments are included in a summary of a respective one of the content items based on a set of segment features, the set of segment features comprises the respective position of a segment in transcript order, terms in the segment, length of the segment, similarity between the segment and the preceding and succeeding segments in the sequence, and changes in feature values between the segment and the preceding and succeeding segments in the sequence.

7. The method of claim 1, further comprising:
verifying, by the processor prior to obtaining the time-aligned text transcript, if the content item can be summarized based at least on the compression budget and a running time of the content item.

8. The method of claim 1, wherein determining informativeness score for each segment of the plurality of segment sequences further comprises:
constructing, by the processor, a graph representing a respective one of a plurality of block sequences wherein each block of the block sequence is a node in the respective graph.

9. The method of claim 8, wherein determining a salience score of each of the blocks further comprises:
for each graph representing a given block sequence:
weighing, by the processor, each of the nodes in the graph based on weights of respective incoming links normalized by weights of respective outgoing links.

10. The method of claim 9, wherein the weight of a link between two nodes in the graph is computed based on tf.idf term weights in a cosine similarity calculation over term feature space.

11. The method of claim 8, wherein determining a diversity score for each block of the plurality of block sequences further comprises:
for each graph representing a given block sequence:
determining, by the processor, transition probabilities for each node based on a number of times the node is visited.

12. An apparatus comprising:
at least one processor;
a storage medium for tangibly storing thereon program logic for execution by the processor, the program logic comprising:
receiving logic, executed by the processor, to receive a content item comprising an audio track as input along with a desired compression budget corresponding to a target length of a summary of the content item;
obtaining logic, executed by the processor, to obtain a time-aligned text transcript of the audio track via automatic speech recognition;
partitioning logic, executed by the processor, to partition the text transcript into a plurality of sequences of segments, wherein each sequence of the segments corresponds to a respective series of non-overlapping time intervals corresponding to respective clips of the received content item;
determining logic, executed by the processor, to determine a informativeness score comprising a salience score and a diversity score for each segment of the plurality of segment sequences;
selecting logic, executed by the processor, to select a subsequence of segments from one of the plurality of segment sequences, the subsequence of segments satisfies the desired compression budget corresponding to the target length and maximizes a combination of coherence and informativeness based on the salience and diversity scores; and
generating logic, executed by the processor, to generate a summary content item comprised of the respective clips from the received content item corresponding to the subsequence of segments.

13. The apparatus of claim 12, wherein the received audio track is associated with a video content item.

14. The apparatus of claim 13, wherein the summary content item further comprises clips of the video content item corresponding to the subsequence of segments.

15. A non-transitory computer readable storage medium, comprising instructions, which when executed by a processor cause the processor to:
receive a content item comprising an audio track as input along with a desired compression budget corresponding to a target length of a summary of the content item;
obtain a time-aligned text transcript of the audio track;
partition the text transcript into a plurality of sequences of segments, wherein each sequence of the segments corresponds to a respective series of non-overlapping time intervals corresponding to respective clips of the received content item;
determine a informativeness score comprising a salience score and a diversity score for each segment of the plurality of sets of segment sequences;
select a subsequence of segments from one of the plurality of segment sequences, the subsequence of segments satisfies the desired compression budget corresponding to the target length and maximizes a combination of coherence and informativeness based on the salience and diversity scores; and
generate a summary content item comprised of the respective clips from the received content item corresponding to the subsequence of segments.

16. The non-transitory computer readable medium of claim 15, further comprising instructions that cause the processor to:
determine a coherence score of a subsequence of segments, the coherence score combining a confidence score of a subsequence associated with a first hypothesis and discourse relationships between words in the subsequence.

17. The non-transitory computer readable medium of claim 16, further comprising instructions that cause the processor to:
select a second hypothesis of lower confidence for the subsequence of segments when no segments are available in the first hypothesis for the determination of the coherence score.

18. The non-transitory computer readable medium of claim 15, wherein the informativeness score indicates a probability that a respective segment belongs in the summary content item.

19. The non-transitory computer readable medium of claim 18, wherein the informativeness score of each segment is determined based on training data using a machine learning algorithm, the training data comprises transcripts of content items with labels for particular time spans indicating if the particular time spans should be included in a summary of the respective content item.

20. The non-transitory computer readable medium of claim 19, wherein the segments are included in a summary of a respective one of the content items based on a set of segment features, the set of segment features comprises the set of segment features comprises the respective position of a segment in transcript order, terms in the segment, length of the segment, similarity between the segment and the preceding and succeeding segments in the sequence, and changes in feature values between the segment and the preceding and succeeding segments in the sequence.

21. The non-transitory computer readable medium of claim 20, further comprising instructions that cause the processor to:
    verify, prior to obtaining the time-aligned text transcript, if the content item can be summarized based at least on the compression budget and a running time of the content item.

\* \* \* \* \*